United States Patent [19]

Yamauchi et al.

[11] Patent Number: 4,749,380
[45] Date of Patent: Jun. 7, 1988

[54] AQUEOUS LIQUID SULPHATO-ETHYLSULPHONYL REACTIVE DYE COMPOSITION CONTAINING SMALL AMOUNT OF BUFFER FOR STORAGE STABILITY AT HIGH AND LOW TEMPERATURES

[75] Inventors: Noriaki Yamauchi, Hirakata; Kunihiko Imada, Sakai, both of Japan

[73] Assignee: Sumitomo Chemical Company, Limited, Osaka, Japan

[21] Appl. No.: 880,929

[22] Filed: Jul. 1, 1986

[30] Foreign Application Priority Data

Jul. 16, 1985 [JP] Japan ................................. 60-157547

[51] Int. Cl.$^4$ ............................. C09B 67/26; D06P 1/38
[52] U.S. Cl. ............................................. 8/527; 8/549; 8/620; 8/630; 8/633; 8/918
[58] Field of Search ................................. 8/527, 549

[56] References Cited

U.S. PATENT DOCUMENTS

| | | | |
|---|---|---|---|
| 4,072,463 | 2/1978 | Schlafer et al. | 8/527 |
| 4,149,850 | 4/1979 | Schlafer et al. | 8/527 |
| 4,349,349 | 9/1982 | Nakatsuka et al. | 8/527 |
| 4,443,224 | 4/1984 | Opitz | 8/527 |
| 4,448,583 | 5/1984 | Corso | 8/527 |
| 4,581,036 | 4/1986 | Opitz et al. | 8/527 |
| 4,585,459 | 4/1986 | Opitz et al. | 8/527 |
| 4,589,885 | 5/1986 | Opitz | 8/527 |

*Primary Examiner*—A. Lionel Clingman
*Attorney, Agent, or Firm*—Stevens, Davis, Miller & Mosher

[57] ABSTRACT

An aqueous liquid composition comprising at least one dye represented by the following formula in a free acid form, $$D-(SO_2CH_2CH_2OSO_3H)_n$$

wherein D is an organic dye residue having 1 to 3 sulfo groups, and n is 1 or 2, in an amount of 5 to 50% by weight, a buffer in an amount of not less than 0.1% by weight but less than 1% by weight, and a substance inert to the above dye in an amount of 0 to 10% by weight, the balance being water, and a pH value of the aqueous liquid composition ranging from 2.5 to 5.5, whcih can be stored for a long period of time even at low and high temperatures without physical and chemical changes.

6 Claims, No Drawings

AQUEOUS LIQUID SULPHATO-ETHYLSULPHONYL REACTIVE DYE COMPOSITION CONTAINING SMALL AMOUNT OF BUFFER FOR STORAGE STABILITY AT HIGH AND LOW TEMPERATURES

The present invention relates to a reactive dye-containing aqueous liquid composition having high storage stability.

Industrial dyeing and printing with a reactive dye have been carried out usually in an aqueous medium, and therefore dyes commercially available in the form of powder or granule must be dissolved in hot water to be subjected to the aqueous medium dyeing and printing.

Recently, development of dyes in a form suitable for an automatic weighing system has been required increasingly, because a dye house has been actively automated in many aspects.

An aqueous liquid dye composition is now noticeable, because it makes no dust when handled and has no pollution problem on an operation environment, it requires no dissolving process to contribute to a labor- and energy-saving, and moreover it is suitable for the automatic weighing system. Thus, an aqueous liquid dye composition with no problem from industrial point of view has been required eagerly to be developed.

A reactive dye-containing aqueous liquid composition can be prepared relatively easily, when the reactive dye has a high water solubility. However, there are many reactive dyes having a water solubility which is not high enough to form the aqueous liquid composition easily. Therefore, in order to improve the water solubility of reactive dyes, there have heretofore been proposed many attempts including addition of various kinds of hydrotropic agents, removal of inorganic salts contained in the dyes or the like. The reactive dye-containing aqueous liquid composition prepared in such a manner is rather stable at ambient temperature. From industrial of view, however, it is usually left at a relatively low temperature such as 0° C. or lower, or a relatively high temperature such as 40° C. or higher through manufacture, custody, transportation including shipping, storage and the like. For this reason, a storage stability at a relatively low or high temperature is a serious problem from industrial point of view.

Particularly, at a relatively high temperature, the reactive dye is, as known, subject to chemical change, i.e. hydrolysis. Therefore, storage for a long period of time at a relatively high temperature causes troubles such that dyeing or printing in any known manner only gives dyed or printed products of a color different from that expected.

On the other hand, storage of the reactive dye-containing aqueous liquid composition at a relatively low temperature causes troubles such that the reactive dyes precipitate or the aqueous liquid composition turns to a paste-like composition due to the lowering of water solubility of the reactive dyes or the salting-out effect of the inorganic salts contained therein, and moreover the precipitate-containing or paste-like composition once formed hardly turns to the original clarified liquid composition, so that an extraordinary time should be required for the preparation of dye bath, and the reproductivity of dyeing can hardly be obtained.

In order to provide a reactive dye-containing aqueous liquid composition having high storage stability, there have heretofore been made many attempts, which are still not satisfactory from industrial point of view.

For example, U.S. Pat. No. 4,072,463 discloses an aqueous liquid composition containing a dye represented by the following formula in a free acid form,

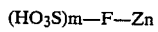

(HO$_3$S)$_m$—F—Z$_n$ wherein F is the radical of a dye chromophore, Z is a fiber reactive group such as $\beta$-sulfatoethylsulfonyl group (SO$_2$CH$_2$CH$_2$OSO$_3$H), and m and n are each an integer, and a large amount of a buffer substance, a pH of the liquid composition being controlled within a range of 3 to 7, preferably 5.5 to 6.8. However, during storage of the liquid dye composition prepared in this manner and controlled within a pH range of 5.5 to 6.8, the sulfatoethylsulfonyl group of the dye of the above formula liberates sulfuric acid and turns to a vinylsulfonyl group, having almost no water-solubilizing ability. This sulfuric acid-liberation reaction makedly lowers usually within an acid region, but continuously proceeds within a pH range of 5.5 to 6.8 in the presence of a buffer substance, forming the vinylsulfonyl group, so that the water-solubility of the dye is much lowered.

In addition thereto, the water-solubility of the dye is also lowered by the presence of a large amount of a buffer substance due to its salting-out effect. For these reasons, when stored at a low temperature, the liquid dye composition readily causes precipitation of the dye cyrstals. Therefore, it is hard to say that the liquid dye composition prepared in the aforesaid manner is satisfactory from industrial viewpoint.

On the other hand, U.S. Pat. No. 4,448,583 proposed an aqueous reactive dye-containing liquid composition containing no buffer substance with a pH value of 2.5 to 4.5. This liquid dye composition is improved in the storate stability at a low temperature, but left unsolved in the storage stability at a high temperature, because the dye contained in the liquid composition readily changes chemically at a high temperature.

Under these circumstances, the present inventors have undertaken extensive studies to find an aqueous liquid composition containing that kind of the dye of the above formula, which is excellent in storage stability under any practical conditions such as high and low temperature conditions, in other words, which is stable from both physical and chemical aspects during storage for a long period of time even at a low or high temperature, and as a result, attained to the present invention.

The present invention provides an aqueous liquid composition comprising at least one dye represented by the following formula (I) in a free acid form,

D—(SO$_2$CH$_2$CH$_2$OSO$_3$H)$_n$     (I)

wherein D is an organic dye residue having 1 to 3 sulfo groups, and n is 1 or 2, in an amount of 5 to 50% by weight, a buffer in an amount of not less than 0.1% by weight but less than 1% by weight, and a substance inert to the dye represented by the aforesaid formula (I) in an amount of 0 to 10% by weight, the balance being water, and a pH value of the aqueous liquid composition ranging from 2.5 to 5.5.

The dyes of the formula (I) usable in the present invention are known, and examples thereof are those described in, for example, the aforesaid U.S. Pat. Nos. 4,072,463 and 4,448,583, and the like. Among such dyes, particularly usable dyes are those having the following formulae in each free acid form:
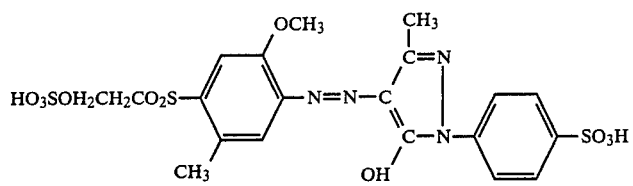
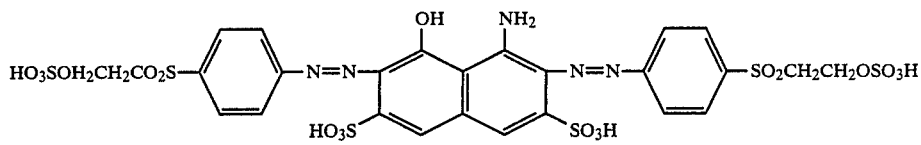
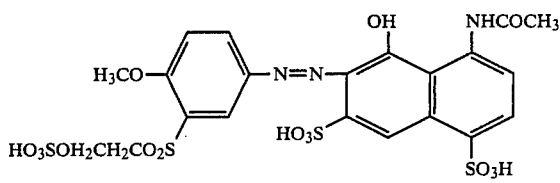
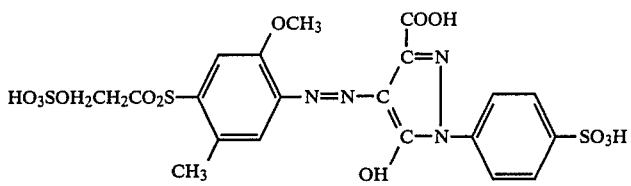
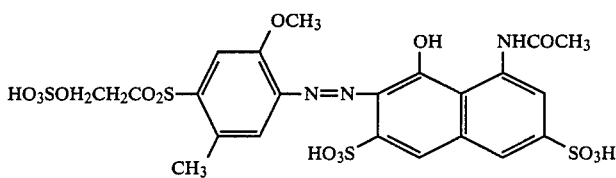
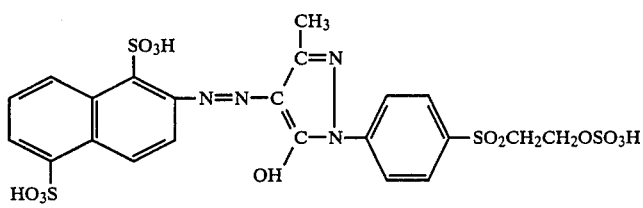
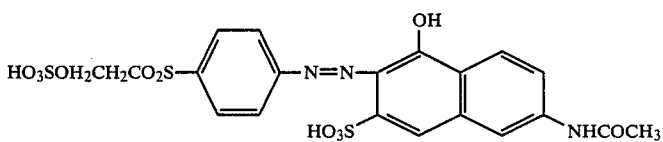
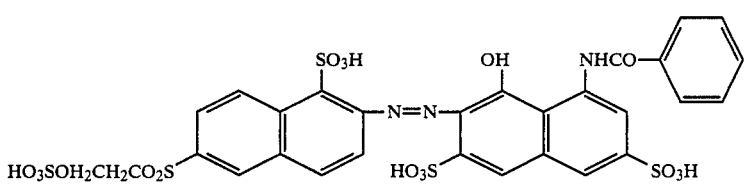

-continued

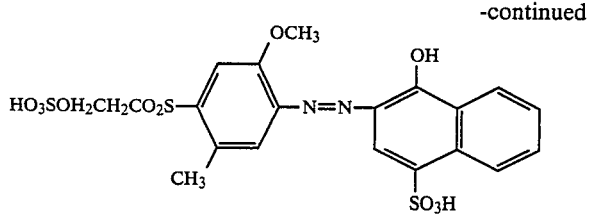

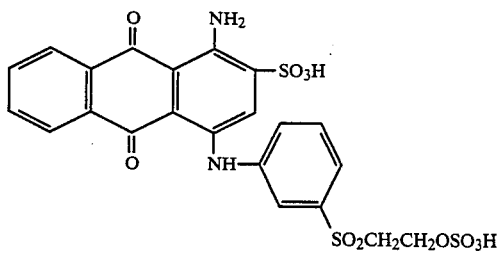

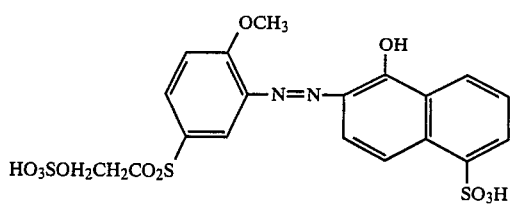

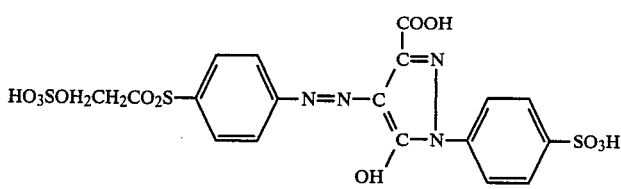

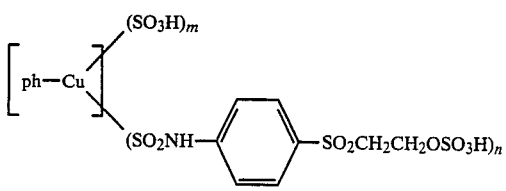

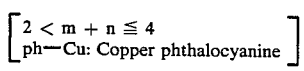

$$\begin{bmatrix} 2 < m + n \leq 4 \\ \text{ph—Cu: Copper phthalocyanine} \end{bmatrix}$$

In the preparation of the aqueous liquid dye composition, the dye-containing reaction mixture as such obtained by any method for the production of the dye (I) may be used. The dye content may be adjusted by subjecting the reaction mixture to concentration (for example, evaporation of a part of water in vacuo). Alternatively, a part of the dye-containing reaction mixture may be dried to obtain a dye powder, and then the powder may be mixed with the remaining dye-containing reaction mixture to adjust the dye content. Thus, the dye (I) is used in the form of an aqueous solution.

When the dye-containing reaction mixture contains too large amount of inorganic salts such as sodium chloride, sodium sulfate and the like, it is preferred to remove the inorganic salts in a conventional manner, for example, by means of a reverse osmotisys or by cooling the aqueous dye solution at a temperature of $-5°$ C. to $5°$ C. to precipitate the inorganic salts which are separated by filtration, and then adjust the inorganic salt content to 10% by weight or less, preferably 5% by weight or less.

The buffer usable in the present invention includes all of those which are known to have a pH buffer effect and inert to the dye of the formula (I).

Preferable examples of the buffer are sodium, potassium or ammonium salts of formic acid, acetic acid, oxalic acid or boric acid, and mono-, di- or trisodium, potassium or ammonium salts of phosphoric acid. Of these, particularly preferred are acetates, borates and phosphates. These buffers may be used each alone or in a mixture of two or more. The amount to be used of the buffer is within a range of from not less than 0.1% by weight ($0.1\% \leq$) to less than 1% by weight ($<1\%$). Preferred amount ranges from 0.2 to 0.8% by weight. It is not effective to use the buffer in an amount of not less than 1% by weight, because the precipitation of dye crystals readily occurs during storage at a low temperature due to the lowering in the solubility of the dye.

The substance inert to the dye of the formula (I), which may be used for the aqueous liquid composition of the present invention in an amount of 0 to 10% by weight, includes inorganic salts which may be by-products produced in the production of the dye (I) and/or those added specially, surface active agents, auxiliary agents for dyeing, hydrotropic agents such as ε-caprolactam, triethanolamine and the like, defoaming agents, anti-freezing agents, antiseptics, and the like.

The pH of the aqueous liquid dye composition can be adjusted within a range of from 2.5 to 5.5 using a mineral acid such as sulfuric acid, hydrochloric acid and hydrobromic acid, or acetic acid, or an alkali such as sodium hydroxide, potassium hydroxide, sodium carbonate, potassium carbonate and sodium hydrogen-carbonate.

The aqueous liquid dye composition in accordance with the present invention can be stored for a long period of time, for example, 6 months at ambient temperature or 4 weeks at 50° C., without change in the liquid state. In addition, even after storage for such a long period of time, the dye composition can give dyed or printed products of a color depth and shade similar to those of the products obtained using the dye composition immediately after the preparation thereof. Moreover, the present aqueous liquid dye composition can hold the original liquid state without precipitation of the dye crystals even after storage for about 4 weeks at a temperature of 0° C.

The aqueous liquid dye composition of the present invention is useful for dyeing or printing fiber materials such as natural or regenerated cellulose, wool, silk, synthetic polyamides and the like, in a conventional manner.

The present invention is illustrated in more detail with reference to the following Examples, which are only illustrative and not intended to limit the scope of the present invention. In Examples, parts and % are by weight.

EXAMPLE 1

Disodium hydrogenphosphate (5 parts) was added to an aqueous clear solution (900 parts) containing a dye of the following formula (I) in a free acid form,

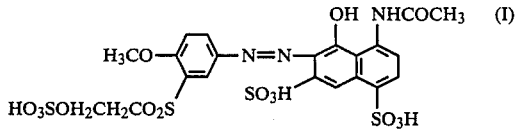

(a dye content 22.2%), and water and diluted sulfuric acid were added thereto to make the whole 1000 parts, obtaining an aqueous liquid dye composition of pH 4.5.

Using the liquid dye composition (10 parts), a dyeing bath, a padding bath and a printing paste were prepared in each 100 parts in a conventional manner, and cotton was dyed or printed respectively by a conventional exhaustion, padding or printing method.

On the other hand, using a dye powder (2.5 parts) having a dye (1) content of 80%, a dyeing bath, a padding bath and a printing paste all having the same dye concentration as above were prepared respectively in the same manner as above, and cotton was dyed or printed in the same manner as above.

The resulting dyed or printed products of a red color were same in the color depth and shade.

The aqueous liquid dye composition obtained above was stored in a closed vessel for 4 weeks at 50° C. and for 4 weeks at 0° C., whereby no change was observed in the liquid state. Thereafter, using the resulting dye composition (10 parts), dyed and printed products were obtained in the same manners as above. The color depth and shade thereof were not different from those of the above.

For the comparison purpose, the above manner for preparation of the liquid dye composition was repeated, provided that no buffer (disodium hydrogenphosphate) was used. The resulting aqueous liquid dye composition of pH 4.5 was stored for 4 weeks at 50° C., and thereafter used for the dyeing and printing in the same manner as above, thereby obtaining dyed products of each bluish dark red. This facts demonstrate that the dye (1) chemically changed during the storage.

On the other hand, the above manner was repeated, provided that disodium hydrogenphosphate was added in an amount of 50 parts, and then water and diluted sulfuric acid were added to make the whole 1000 parts. After storage of the resulting aqueous liquid dye composition of pH 4.5 for 4 weeks at 0° C., precipitation of dye crystals was observed. The crystals did not disappear even when the temperature was raised to room temperature (25° C.).

EXAMPLE 2

Anhydrous sodium acetate (5 parts) and ε-caprolactam (50 parts) were added to an aqueous clear solution (900 parts) containing a dye of the following formula (2) in a free acid form,

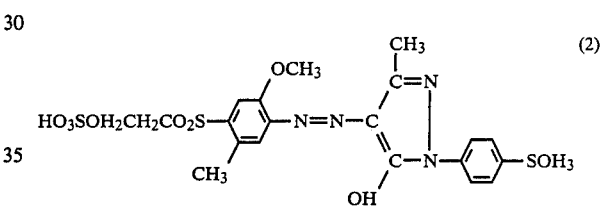

(a dye content 27.8%), and then water and diluted sulfuric acid were added thereto to make the whole 1000 parts, obtaining an aqueous liquid dye composition of pH 3.5.

Using the liquid dye composition (10 parts), a printing paste (100 parts) was prepared in a conventional manner. Cotton was printed using the printing paste in a conventional manner to obtain a printed product of a yellow color.

The above aqueous liquid dye composition could be stored for 4 weeks at 50° C. and for 4 weeks at 0° C., both in a closed vessel without change in an original liquid state. After the storage, the composition was used for the printing in the same manner as above to obtain a printed product of a color depth and shade which were not different from those of the above.

On the other hand, an aqueous liquid composition of pH 3.5 prepared in the same manner as above, provided that anhydrous sodium acetate (50 parts) was used, and then water and diluted sulfuric acid were added to make the whole 1000 parts, was stored for 4 weeks at 0° C. Then, precipitation of the dye cyrstals was observed, and the crystals did not disappear even when the temperature was raised to room temperature.

EXAMPLE 3

Anhydrous sodium acetate (2 parts) was added to an aqueous clear reaction mixture (900 parts) containing a dye of the following formula (3) in a free acid form,

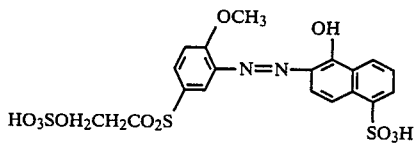

(3)

(a dye content 27.8%), and water and diluted sulfuric acid were added thereto to make the whole 1000 parts, thereby obtaining an aqueous liquid dye composition of pH 2.5.

Using this liquid dye composition (10 parts), a printing paste (100 parts) was prepared in a conventional manner. Cotton was printed using this printing paste in a conventional manner to obtain a printed product of a color depth and shade, which were the same as those of a printed product obtained by preparing a printing paste of the same concentration as above using a dye powder (5 parts) having a dye (3) content of 50%, and printing cotton using the printing paste in the same manner as above.

The liquid dye composition could be stored for 4 weeks at 60° C. and for 4 weeks at 0° C., both in a closed vessel without change in the liquid state. Thereafter, using the composition (10 parts), printing was carried out in the same manner as above to obtain a printed product of a color depth and shade which were not different from those of the above.

For the comparison purpose, an aqueous liquid dye composition of pH 2.5 prepared in the same manner as above, provided that no buffer (anhydrous sodium acetate) was used, was stored for 4 weeks at 60° C. Thereafter, using the resulting composition, printing was carried out in the same manner as above to obtain a printed product of a markedly low color depth.

EXAMPLES 4 to 8

Using each dye of the formulas (4) to (8), each aqueous liquid dye composition was prepared in the same manner as in Example 3. The liquid dye composition could be store for 4 weeks at 60° C. and for 4 weeks at 0° C., both in a closed vessel without change in each liquid state.

After the storage, each liquid dye composition was used for printing cotton in the same manner as above to obtain each printed product of a color depth and shade, which were not different from those of each printed product obtained using the liquid dye composition prior to the storage.

| Dye | | Buffer Kind | Amount parts/parts | pH of Composition |
|---|---|---|---|---|
| (4) HO₃SOH₂CH₂CO₂S—⌬—N=N—C(COOH)=C—C(OH)—N(—⌬—SO₃H) (pyrazolone structure) | | Disodium hydrogen-phosphate | 5/1000 | 4.8 |
| (5) HO₃SOH₂CH₂CO₂S—⌬—N=N—(naphthalene: OH, HO₃S, NHCOCH₃) | | Anhydrous sodium acetate | 9/1000 | 5.0 |
| (6) anthraquinone with O, NH₂, SO₃H, NH—⌬—SO₂CH₂CH₂OSO₃H | | Anhydrous sodium acetate | 8/1000 | 4.5 |
| (7) [ph—Cu(SO₃H)ₘ(SO₂NH—⌬—SO₂CH₂CH₂OSO₃H)ₙ]  2 < m + n ≦ 4; ph—Cu: Copper phthalocyanine | | Anhydrous sodium acetate | 2/1000 | 4.0 |
| (8) HO₃SOH₂CH₂CO₂S—⌬—N=N—(naphthalene: OH, NH₂, HO₃S, SO₃H)—N=N—⌬—SO₂CH₂CH₂OSO₃H | | Anhydrous sodium acetate | 8/1000 | 4.7 |

What is claimed is:

1. An aqueous liquid composition comprising at least one dye represented by the following formula in a free acid form,

D—(SO₂CH₂CH₂OSO₃H)ₙ wherein D is an organic dye residue having 1 to 3 sulfo groups, and n is 1 or 2, in an amount of 5 to 50% by weight, a buffer in an amount of 0.2-0.8% 1% by weight, and a substance inert to the above dye in an amount of 0 to 10% by weight, the balance being water, and a pH value of the aqueous liquid composition ranging from 2.5 to 5.5.

2. An aqueous liquid composition according to claim 1, wherein the buffer is at least one member selected from sodium, potassium and ammonium salts of formic acid, acetic acid, oxalic acid and boric acid, and mono-, di- or tri-sodium, potassium and ammonium salts of phosphoric acid.

3. An aqueous liquid composition according to claim 1, wherein the substance inert to the dye is at least one member selected from inorganic salts, surface active agents, auxiliary agents for dyeing, hydrotropic agents, defoaming agents, antifreezing agents, and antiseptics.

4. An aqueous liquid composition according to claim 1, wherein the dye is represented by the following formula in a free acid form,

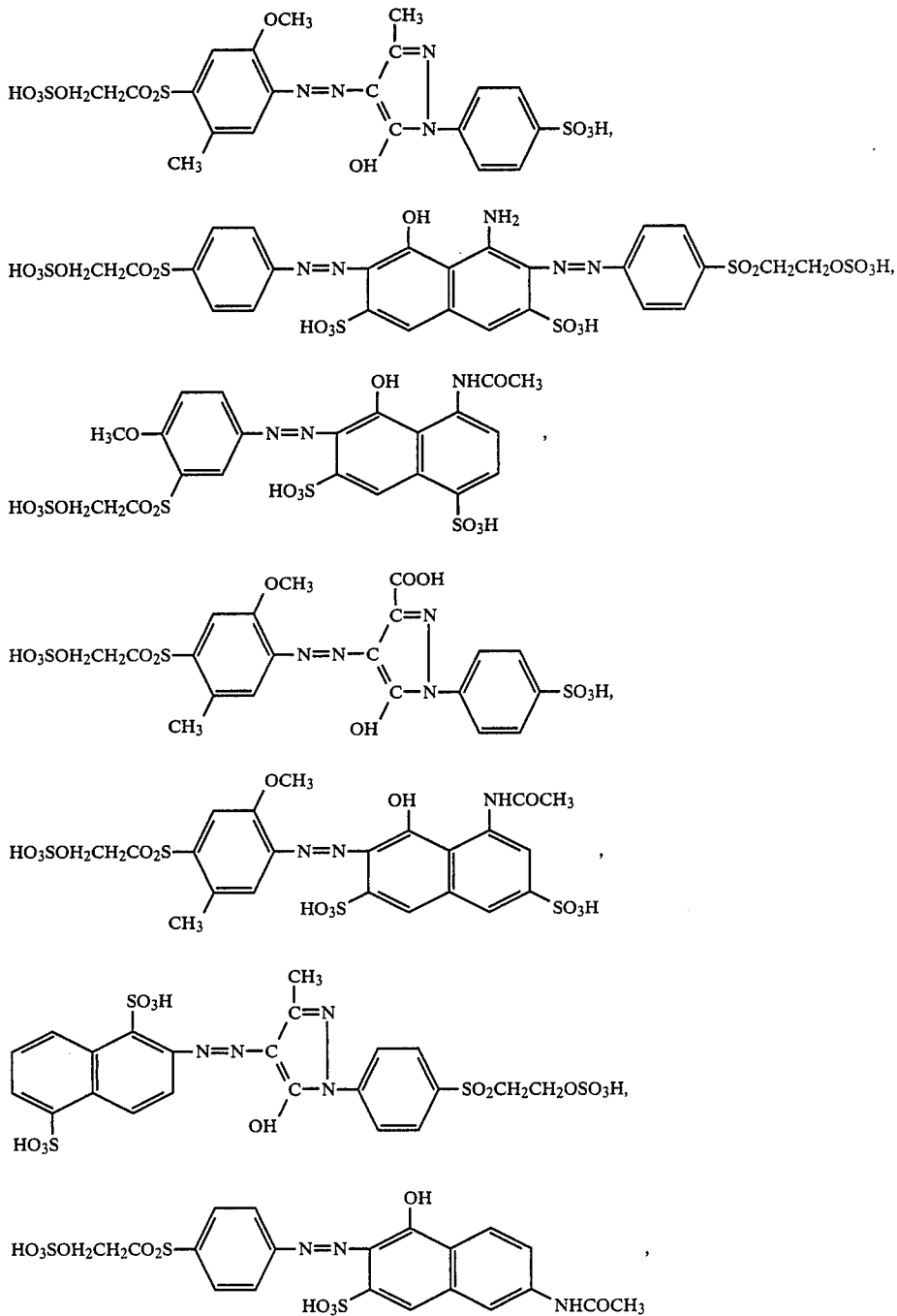

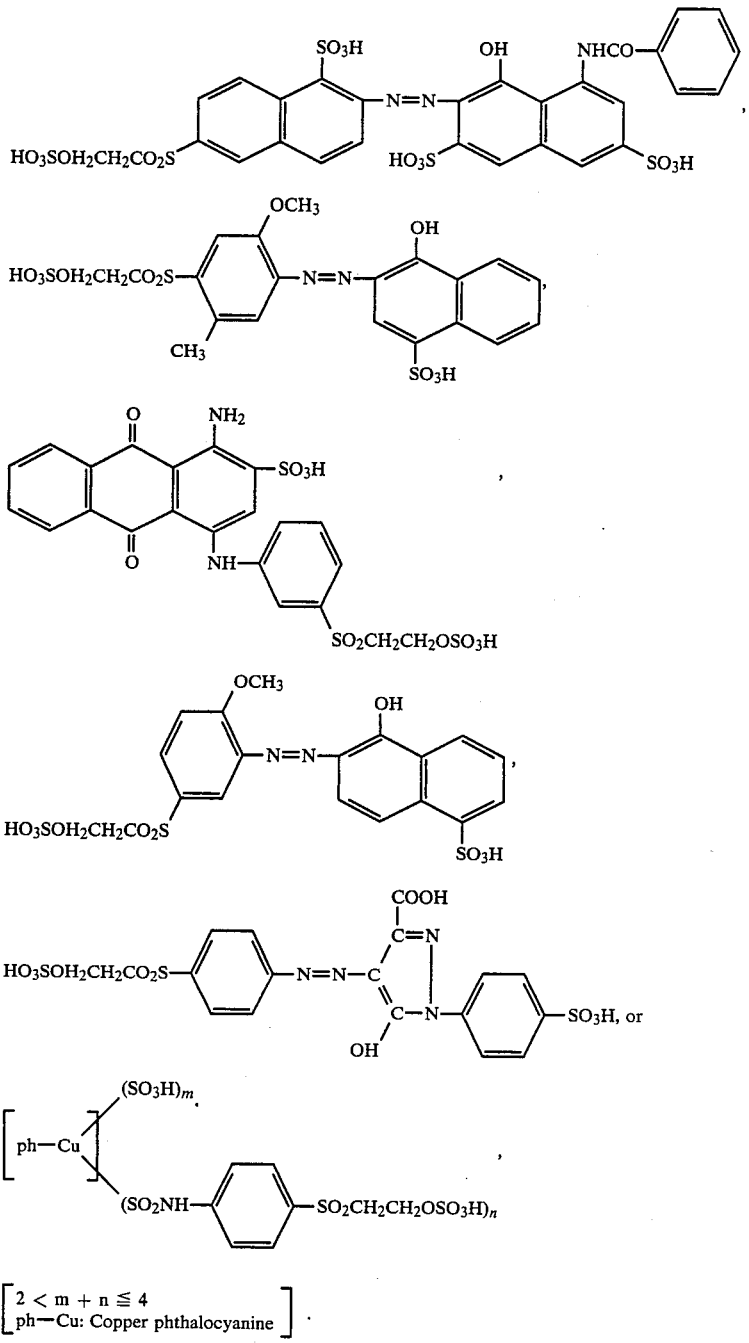

5. A method for storing a reactive dye represented by the following formula in a free acid form, D—(SO$_2$CH$_2$CH$_2$OSO$_3$H)$_n$ wherein D is an organic dye residue having 1 to 3 sulfo groups, and n is 1 or 2, in an aqueous liquid form, which comprises preparing an aqueous liquid composition comprising at least one dye represented by the above formula in an amount of 5 to 50% by weight, a buffer in an amount of 0.2–0.8% by weight, and a substance inert to the above dye in an amount of 0 to 10% by weight, the balance being water, and a pH value of the aqueous liquid composition ranging from 2.5 to 5.5.

6. A method for dyeing or printing fiber materials, which comprises using an aqueous liquid composition comprising at least one dye represented by the following formula in a free acid form, D—(SO$_2$CH$_2$CH$_2$OSO$_3$H)$_n$ wherein D is an organic dye residue having 1 to 3 sulfo groups, and n is 1 or 2, in an amount of 5 to 50% by weight, a buffer in an amount of 0.2–0.8% by weight, and a substance inert to the above dye in an amount of 0 to 10% by weight, the balance being water, and a pH value of the aqueous liquid composition ranging from 2.5 to 5.5.

* * * * *

UNITED STATES PATENT AND TRADEMARK OFFICE
CERTIFICATE OF CORRECTION

PATENT NO. : 4,749,380

DATED : June 7, 1988

INVENTOR(S) : Noriaki YAMAUCHI et al

It is certified that error appears in the above-identified patent and that said Letters Patent is hereby corrected as shown below:

Claim 1. (column 11), line 7, after "of 0.2-0.8%" delete "1%".

Signed and Sealed this

Fifteenth Day of May, 1990

Attest:

HARRY F. MANBECK, JR.

*Attesting Officer*      *Commissioner of Patents and Trademarks*